United States Patent
O'Shea et al.

(10) Patent No.: US 7,203,837 B2
(45) Date of Patent: Apr. 10, 2007

(54) METHODS AND SYSTEMS FOR UNILATERAL AUTHENTICATION OF MESSAGES

(75) Inventors: Gregory O'Shea, Buckhurst Hill (GB); Michael Roe, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 756 days.

(21) Appl. No.: 09/833,922

(22) Filed: Apr. 12, 2001

(65) Prior Publication Data

US 2002/0152380 A1    Oct. 17, 2002

(51) Int. Cl.
*H04L 9/00* (2006.01)
*H04K 1/00* (2006.01)

(52) U.S. Cl. .................. 713/170; 713/176; 380/247
(58) Field of Classification Search ............. None
See application file for complete search history.

(56) References Cited

U.S. PATENT DOCUMENTS

| | | | |
|---|---|---|---|
| 5,473,691 A | | 12/1995 | Menezes et al. |
| 5,511,122 A | * | 4/1996 | Atkinson ............ 713/153 |
| 5,673,319 A | | 9/1997 | Bellare et al. |
| 5,729,608 A | | 3/1998 | Janson et al. |
| 5,778,065 A | | 7/1998 | Hauser et al. |
| 5,787,172 A | * | 7/1998 | Arnold ............... 713/175 |
| 5,892,904 A | | 4/1999 | Atkinson et al. |
| 5,944,794 A | * | 8/1999 | Okamoto et al. ...... 709/225 |
| 6,055,236 A | * | 4/2000 | Nessett et al. ........ 370/389 |
| 6,108,583 A | * | 8/2000 | Schneck et al. ......... 700/9 |
| RE36,946 E | * | 11/2000 | Diffie et al. ........... 380/278 |
| 6,148,405 A | * | 11/2000 | Liao et al. ............. 713/201 |
| 6,229,806 B1 | * | 5/2001 | Lockhart et al. ...... 370/389 |
| 6,367,012 B1 | | 4/2002 | Atkinson et al. |
| 6,600,823 B1 | * | 7/2003 | Hayosh ................. 380/51 |

OTHER PUBLICATIONS

Greg O'Shea, Child-proof Authentication for MIPv6 (CAM), Jan.-Feb. 2000; ACM.*
Archives of the "Big Internet" mailing list, http://gd.tuwien.ac.at/infosys/network/docs/ietf.org/concluded-wg-ietf-mail-archive/big-internet/1994-07, retrieved on Aug. 25, 2006, p. 20.

* cited by examiner

*Primary Examiner*—Nasser Moazzami
*Assistant Examiner*—Pramila Parthasarathy

(57) ABSTRACT

A system and method for authentication verifies the address of an information sender based on the sender's address, public key, and a digital signature. A portion of the sender's address is derived from the public key, such as by incorporating a portion of a hash of the public key with or without a modifier. The sender provides information including content data, the public key, the address, and the digital signature generated using the private key corresponding to the public key. Upon reception, the recipient verifies the address by recreating it from the public key. The signature is verified using the network address and public key. The recipient accepts the content data when both the address and signature are verified. The content data may include a communications parameter of the sender, such as a care-of address where the sender is a mobile device and the recipient is the sender's home agent.

17 Claims, 8 Drawing Sheets

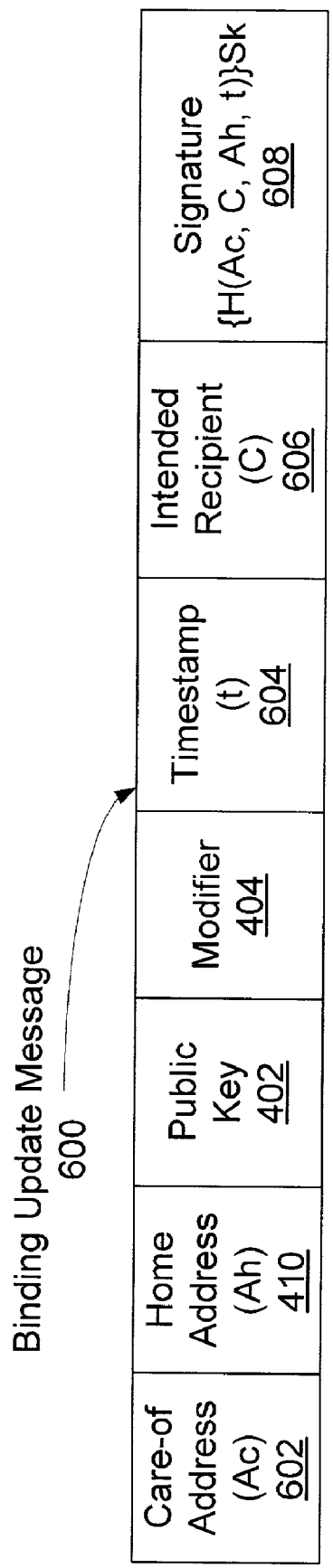

FIG. 7

700 Set home address using the procedure of Figure 5.

702 Create hash of (care-of address, home address and, optionally, timestamp and identifier of intended recipient).

704 Create cryptographic signature of hash created in Step 702 using private key 400 of Figure 4.

706 Populate binding update message with care-of address, home address, public key, modifier if used to create home address, cryptographic signature, and, optionally, timestamp and identifier of intended recipient.

708 Send binding update message to intended recipient.

Done.

METHODS AND SYSTEMS FOR UNILATERAL AUTHENTICATION OF MESSAGES

TECHNICAL FIELD

The present invention relates generally to communications in computer networks, and, more particularly, to information authentication in connection with communications between network nodes.

BACKGROUND OF THE INVENTION

Authentication is an important issue in all types of network communications. The ability to authenticate is especially critical when the communications are for the purpose of changing network communication parameters. The computer network environment of a computer may change so rapidly that it is rarely practical to configure a device to know beforehand the values of all the parameters it may need to use in communicating with other devices (here called "correspondents"). As an example of rapidly changing communication parameters, consider a mobile device such as a laptop computer equipped with a wireless network card. The network address of the laptop changes as it moves from one wireless network area to another. A correspondent wishing to communicate with the laptop cannot know beforehand what wireless network address the laptop will use. Even if the correspondent could discover the laptop's current network address, that address may become obsolete the next instant as the laptop moves to a new wireless network area.

To allow communications to proceed in the face of such flux, some communications protocols provide for update messages. Continuing the example of the mobile laptop computer, when the laptop changes its wireless network address, it sends update messages to all correspondents it intends to communicate with to inform them of the new network address. In this context, the new wireless network address is the communication parameter to be changed. Besides this direct publication of the new address, some protocols allow the address change to be published indirectly. To that end, the laptop has a fixed and routable "home address." The home address serves as a unique identifier of the laptop on a "home network." Correspondents send messages intended for the laptop to the laptop's fixed home address. A "home agent" on the home network receives the messages and forwards them to the current wireless network address of the laptop. In this indirect addressing method, the laptop's current wireless network address is called its "care-of address." The laptop needs to inform only the home agent of changes to its care-of address, and the other correspondents continue to use the laptop's unchanged home address to communicate with the laptop. Similar direct and indirect methods are generally useful for publishing parameters other than changing addresses.

A serious concern regarding the use of update messages for changing communication parameters is caused by the risk of fraudulent publication. For example, in one scenario, a malicious attacker who wants to "tap" the communications intended for the laptop may send a fraudulent update message to the laptop's home agent to update the laptop's care-of address to be the address of the attacker. If the home agent is unable to detect the falsity of the fraudulent message and acts on the message to make the change, traffic intended for the laptop will be routed by the home agent to the attacker instead. The attacker can then read the traffic before sending it along to the laptop, thereby "tapping" its communications.

Protocols address the problem of fraudulent publication by implementing authentication services. The recipient of an update message uses the authentication services to verify the identity of the sender of the message and acts on the update message only if the authentication shows that the message was sent by a device with the authority to change the parameter. For example, the Internet Engineering Task Force Request for Comments (IETF RFC) 2401 "Security Architecture for the Internet Protocol" mandates the use of IPsec authentication for update messages in the Mobile Internet Protocol (MIPv6). Other protocols provide similar authentication services. However, one perceived difficulty in implementing the authentication functionality is that IPsec and other authentication services provide their security by means of quite complicated mechanisms. They come at a heavy price in terms of a significant investment in administrative and communicative overhead. This overhead may impede the growth of mobile networks. On the other hand, without a suitable authentication mechanism, the new networks are vulnerable to simple attacks.

What is needed is a lightweight, easily deployable, mechanism for authenticating parameter update messages that provides much of the security of heavyweight authentication mechanisms such as IPsec, but with lower administrative and communicative overhead.

SUMMARY OF THE INVENTION

In view of the foregoing, the present invention provides a simple unilateral authentication mechanism that enables an information recipient to quickly ascertain that the information comes from an authorized sender without the extensive network communications and administrative overhead associated with heavyweight authentication mechanisms. This authentication mechanism integrates a private-public key pair authentication scheme with the selection of a network address of the sender such that the recipient can verify the association between the network address and a private key held by the sender, i.e., the information could only have come from a sender for whom the home address was created. When this association is verified, the recipient accepts the information and acts on it accordingly. This authentication mechanism is unilateral in that the recipient can authenticate the information based only on the data provided, without having to conduct further communications with the sender or any authentication services to complete the authentication process. The simplicity and low overhead of this unilateral authentication mechanism makes it especially suitable for networks where there is a strong need for authentication but the deployment of heavyweight authentication services such as IPSec is not feasible for various reasons.

Particularly, according to the authentication mechanism of the invention, the sender holds a public-private encryption key pair for cryptographic authentication purposes. The sender has a network address that is derived from the public key, such as by incorporating a portion of the hash of the public key with or without a modifier for preventing address conflicts. The sender provides information including content data, the network address of the sender, the public key of the sender, optional data such as a time stamp for preventing replay attacks and the modifier if it is used in creating the network address, and a signature generated by signing, with the private key of the sender, a hash value of data including the content data, the network address, and the optional data.

The content data may include data for updating a communications parameter of the sender, such as a care-of address in the case where the sender is a mobile device and the recipient is a home agent for the sender.

Upon receiving the information, the recipient uses the public key and modifier, if present, to recreate the relevant part of the sender's network address. If the recreated part of the address does not match the corresponding part of the received network address of the sender, the message is considered invalid and may be discarded. If the network address is properly recreated, the recipient verifies the signature using the received public key and the network address. If the signature is verified to be valid, the recipient knows that signature was created using the private key that corresponds to the public key used to create the sender's network address. In this way, an association between the network address of the sender and the private key of the sender is established. Since the sender is presumably the only device that knows that private key, the recipient can determine to accept the received content data based on this association.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 6 is a schematic diagram showing the data structure of the update message of the mobile device;

FIG. 7 is a flowchart of a procedure for creating the update message by the mobile device.

DETAILED DESCRIPTION OF THE INVENTION

Figure 1:
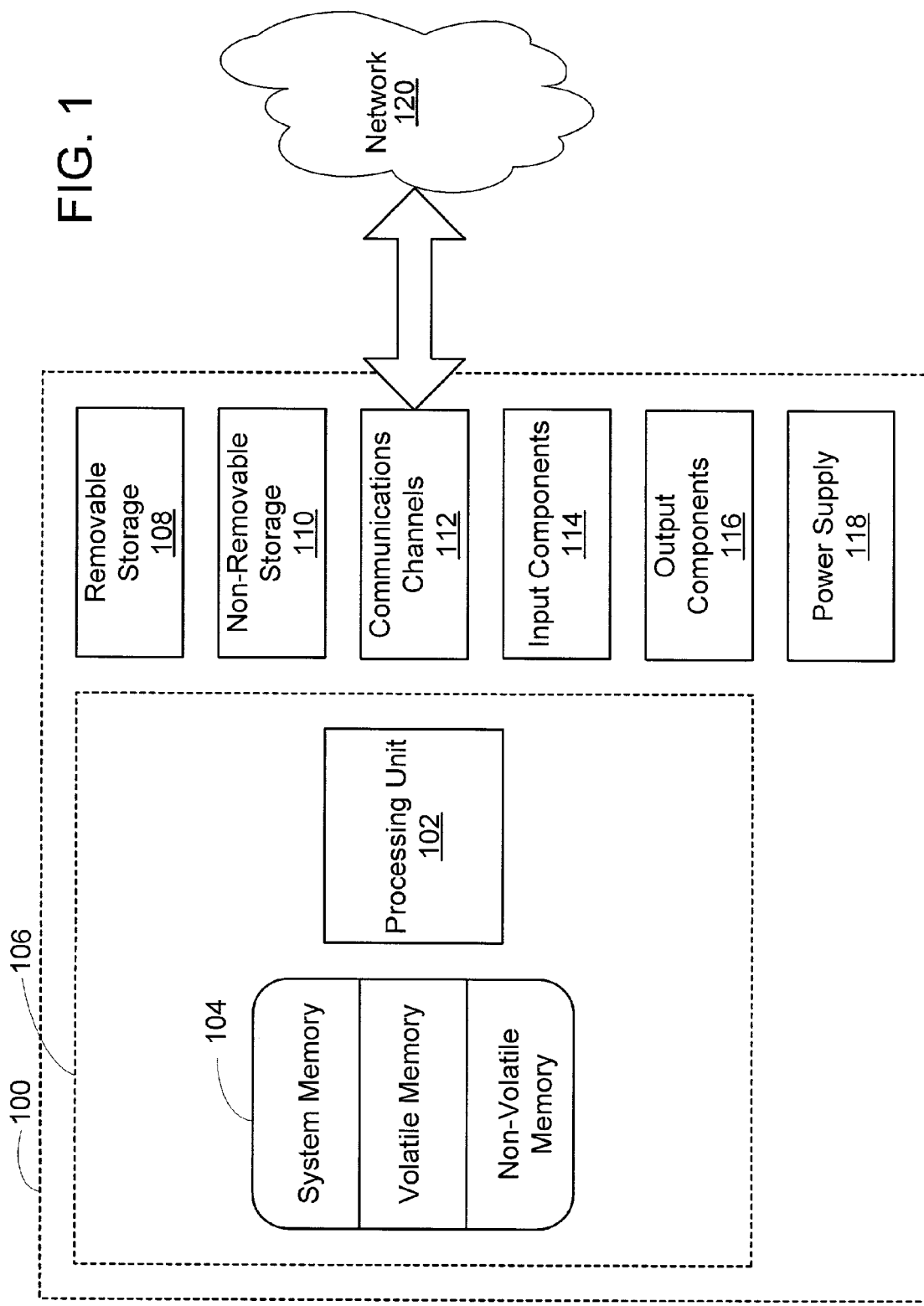
FIG. 1 is a schematic diagram showing an exemplary computer architecture usable for constructing computer nodes for network communications, on which the message authentication mechanism of the invention may be implemented.

Turning to the drawings, wherein like reference numerals refer to like elements, the invention is illustrated as being implemented in a suitable computing environment. The following description is based on embodiments of the invention and should not be taken as limiting the invention with regard to alternative embodiments that are not explicitly described herein.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware or in a hardware/software combination.

Referring to FIG. 1, the present invention relates to communications between network nodes on various connected computer networks. Each of the network nodes may reside in a computer that may have one of many different computer architectures. For description purposes, FIG. 1 shows a schematic diagram of an exemplary computer architecture usable for these devices. The architecture portrayed is only one example of a suitable environment and is not intended to suggest any limitation as to the scope of use or functionality of the invention. Neither should the computing devices be interpreted as having any dependency or requirement relating to any one or combination of components illustrated in FIG. 1. The invention is operational with numerous other general-purpose or special-purpose computing or communications environments or configurations. Examples of well-known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In their most basic configuration, each device typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106. The devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable, media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks (DVD), other optical storage, magnetic cassettes, magnetic tape, magnetic disk storage, other magnetic storage devices, and any other media which can be used to store the desired information and which can accessed by the mobile computer, correspondent, and home agent. These devices may also contain communication channels 112 that allow the host to communicate with other devices. Communications channels 112 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, radio, infrared, and other wireless media. The term computer-readable media as used herein includes both storage media and communications media. The devices may also have input components 114 such as a keyboard, mouse, pen, a voice-input component, a touch-input device, etc. Output components 116 include screen displays, speakers, printer, etc., and rendering modules (often called "adapters") for driving them. Each of the devices has a power supply 118. All these components are well know in the art and need not be discussed at length here.

The Problem of Authentication

The present invention is directed to a simplified, lightweight, authentication mechanism for a recipient of a message to authenticate the message, i.e., to determine whether the message is from an authorized sender. This authentication mechanism may be advantageously used for providing adequate network security with respect to messages for updating network communication parameters and is especially useful for mobile computers to send their new network addresses as they move to different network areas. It will be appreciated, however, that the present invention is not limited to parameter updating and may be used for the authentication of other types of network communications with different message contents.

Figure 2:
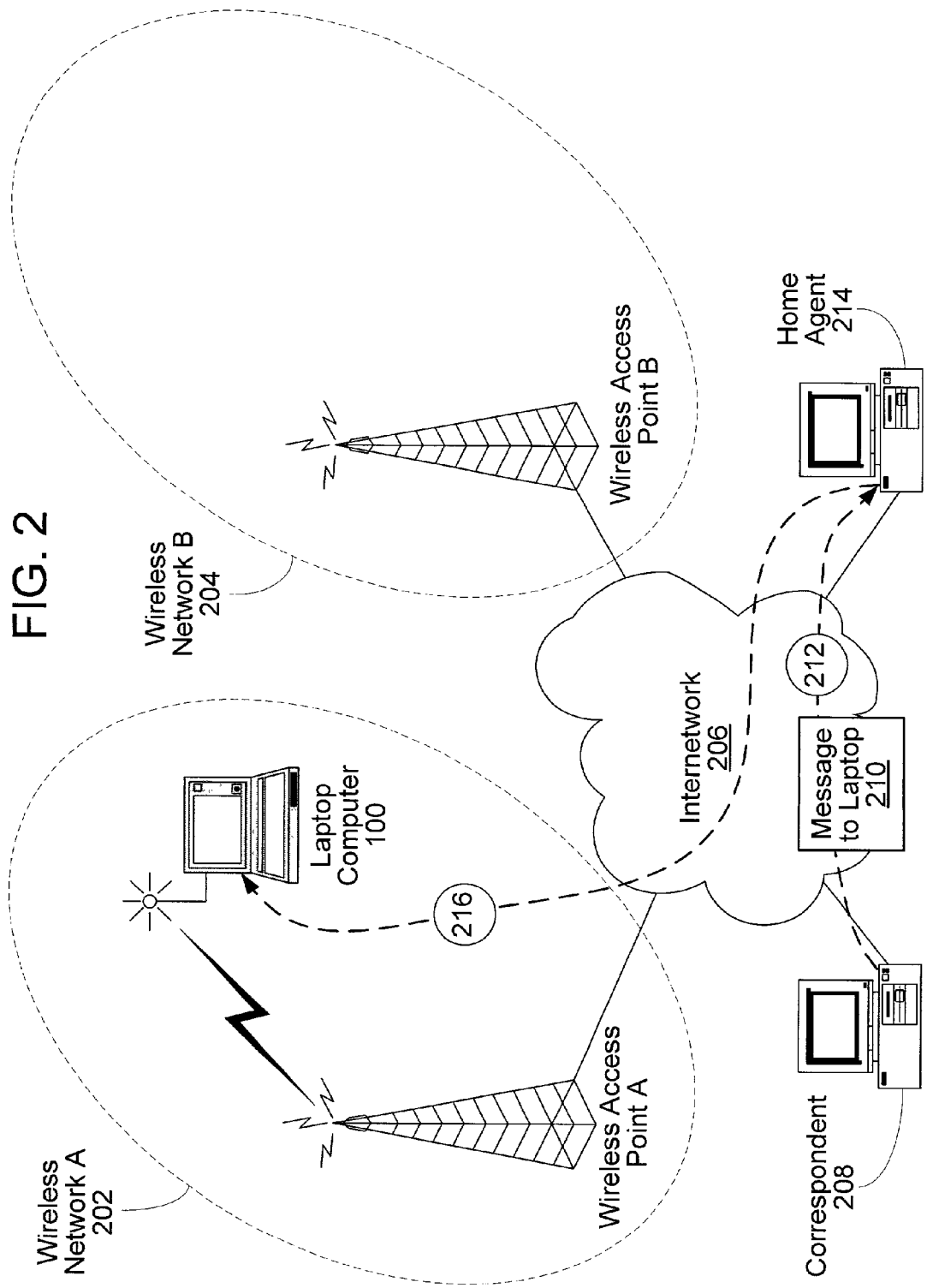
FIG. 2 is a schematic diagram showing an exemplary communications network in which an embodiment of the invention may be practiced for authenticating update messages send by a mobile device.

To facilitate an understanding of the need for a lightweight, low-overhead, and easily deployable authentication mechanism such as the one provided by the invention, consider an embodiment in which the message is a parameter update message sent by a mobile computing device such as the laptop computer 100 in FIG. 2. The laptop communicates via a wireless communications protocol. When the laptop operates within the wireless network A 202, the laptop uses an address compatible with that network. When the laptop moves to another wireless network, such as wireless network B 204, the laptop changes its address to one compatible with the new network. To enable messages to continue to reach the laptop, the laptop must publish news of its changed address. The networks and devices in FIG. 2 are all connected together by a network 206, called an "internetwork," which may comprise one or more linked computer networks. The Internet is one example of an internetwork.

For a correspondent 208 that wishes to send messages to the laptop computer 100, there are two methods that the correspondent can use. In the "direct" method, the correspondent knows the wireless network address currently used by the laptop and sends messages directly to that address. This method requires that the correspondent keep track of the laptop's address as the laptop moves from one wireless network to another. In the "indirect" method, the laptop sets up a unique and fixed home address. To communicate with the laptop, the correspondent always sends its message 210 to the laptop's home address. Following message path 212, the message is received by the laptop's home agent 214. The home agent provides message-forwarding services to the laptop. By reading the home address in the message, the home agent decides that the message is intended for the laptop. The home agent translates the laptop's home address into the laptop's current wireless network address and forwards the message along message path 216 to the laptop. When forwarding, the laptop's current wireless network address is called its "care-of" address. In this indirect method, only the home agent need keep track of the laptop's wanderings. Although the indirect method requires at least one more network "hop" for every message sent to the laptop, it is administratively more efficient than the direct method if there are several correspondents. The indirect method also enables correspondents previously unknown to the laptop, correspondents that could not keep track of the laptop's wireless network address as it changes, to communicate with the mobile laptop through the laptop's well-known and unchanging home address. The remainder of this discussion focuses on the indirect method. The techniques discussed below to update the home agent, when using the indirect method, can be used in exactly the same manner to update the correspondent, when using the direct method.

Note that FIG. 2 is for illustrative purposes only and is not meant to limit the scope of the invention. The invention is generally useful for authenticating messages, which are not necessarily for publishing parameters. For example, the invention is useful even among devices none of which move.

Figure 3:
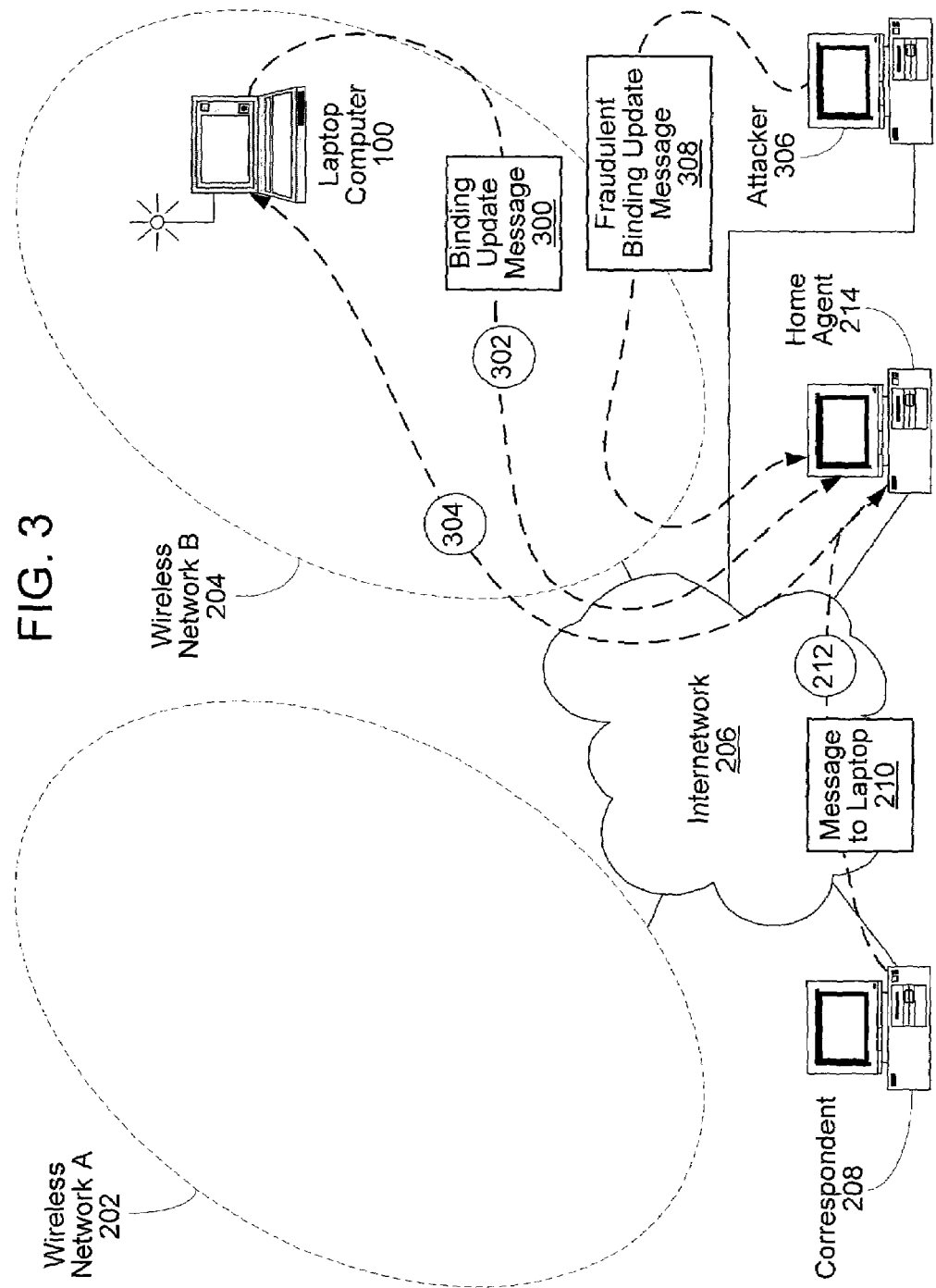
FIG. 3 is a schematic diagram similar to that of FIG. 2 but with the mobile device moved to a different wireless network and showing the transmission of an update message from the mobile device to a home agent.

In the scenario shown in FIG. 3, the laptop computer 100 has moved to wireless network B 204. It operates under a new care-of address appropriate to the new network. Messages sent to its previous care-of address no longer reach it. The laptop prepares a parameter update message 300 to inform the home agent 214 of its new care-of address. In the specific case of updating the care-of address, the parameter update message is commonly called a "binding update" message. The binding update message travels along message path 302 to the home agent. Upon receipt of the binding update message 300, the home agent changes its message forwarding translation table. Future messages addressed to the laptop's unchanged home address are now forwarded to the new care-of address contained in the binding update message. For example, the correspondent 208, oblivious to the change in the laptop's care-of address, sends its message 210 via message path 212 to the laptop's home address, just as it did in FIG. 2. The home agent 214 translates the home address into the new care-of address and forwards the message over message path 304 to the laptop. Thus, the correspondent 208 stays in communication with the laptop 100 even though the correspondent is unaware of the change in the laptop's care-of address.

Without a mechanism for authenticating the binding update message, this system is vulnerable to security attacks. For example, by producing the fraudulent update message 308, the attacker 306 can redirect traffic coming from the home agent 214 and from the correspondent 208. The attacker redirects the traffic to itself instead of to the laptop 100. To fend off this attack, a recipient of a binding update message needs to determine if the message is indeed sent by the laptop device, that is to say, by the only device authorized to change the value of the care-of address. More generally, the recipient of a parameter update message needs to authenticate the sender of the message and act on the message only if it is sent by a device authorized to set the parameter. The next section details how the present invention enables this authentication.

Unilaterally Authenticating a Parameter Update Message

The invention enables a device, such as the laptop computer 100, to write a message, such as the binding update message 300, in such a way that the message could only have been written by this particular device. This authentication mechanism is unilateral in that the recipient does not need to have further communications with the sender for completing the authentication process. This is because the message contains everything the message recipient, such as the home agent 214, needs to decode the message and to determine that it must have come from this particular device. Thus, in the case that the message is for updating communication parameters, if the device has the authority to change the parameters, then the message can be accepted.

Figure 4:
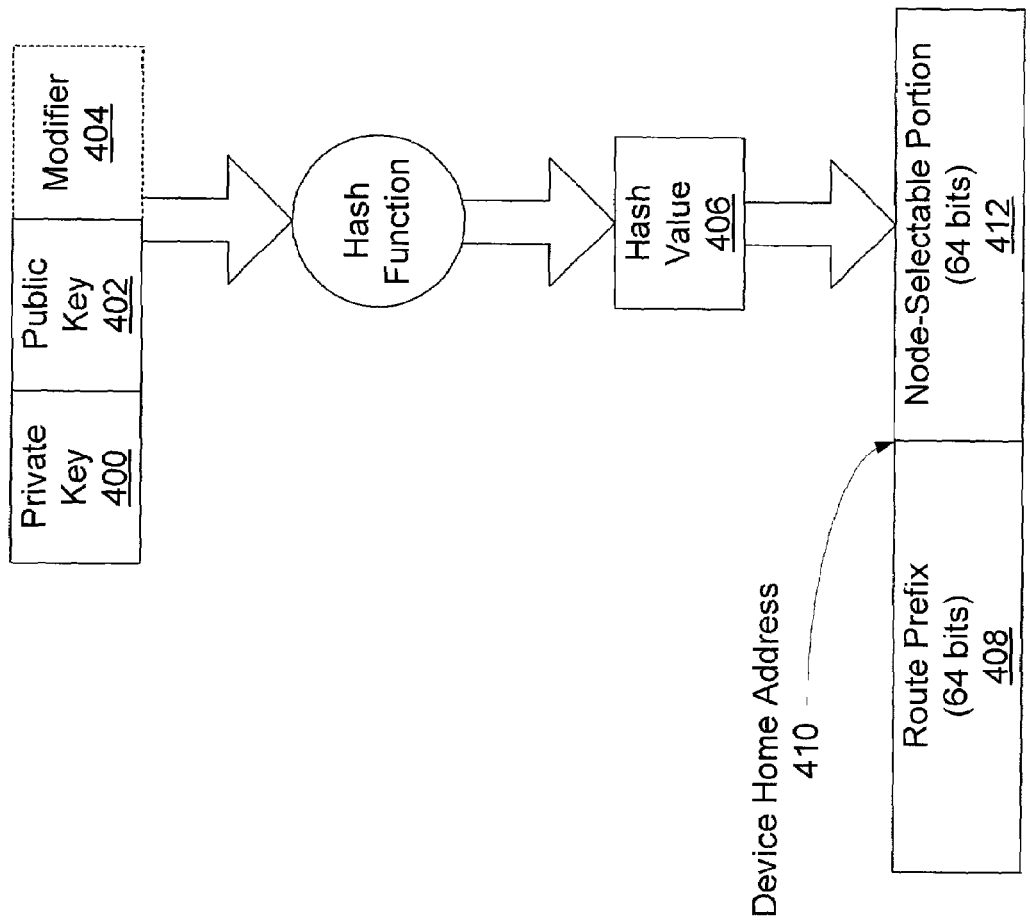
FIG. 4 is a schematic diagram illustrating portions of a home address of the mobile device derived from a public key of the mobile device.
Figure 5:
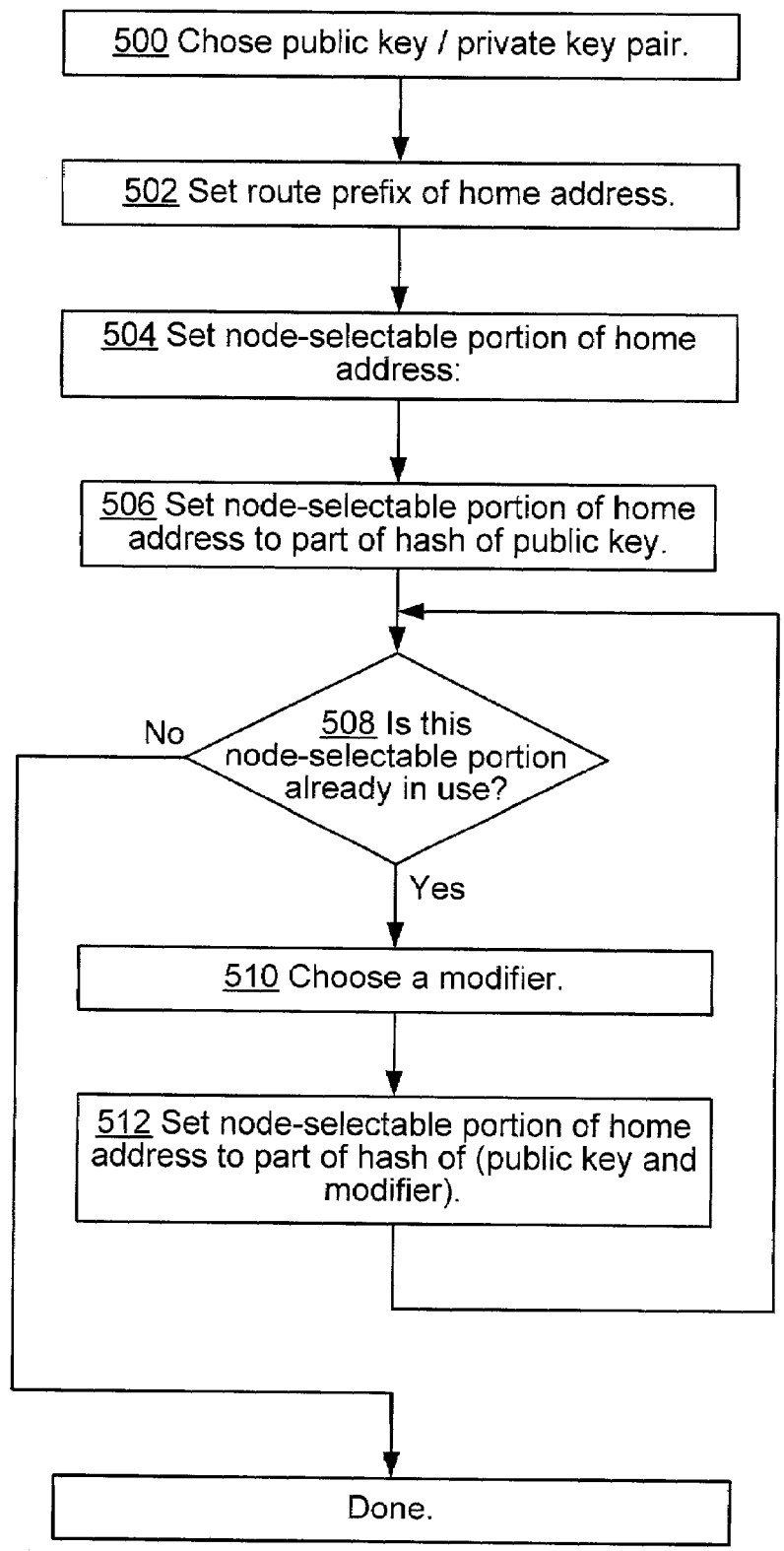
FIG. 5 is a flowchart of a procedure for setting a home address of the mobile device.

The invention is based on public key/private key cryptography used in combination with the selection of a network address of the message sender based on the public key. In the example of FIGS. 2 and 3, the network address is a home address of the laptop computer 100. One way this home address may be derived from the public key of the laptop is describe in connection with FIGS. 4 and 5. In step 500, the laptop selects a cryptographic key pair with a private key 400 and a public key 402. Modem network addresses, such as those used in IPv6, are composed of two parts. The first part, called the route prefix 408, contains a routable address that can be used to route a message to an appropriate network link. In step 502, the laptop sets the route prefix 408 of its home address 410, possibly by listening on its network link for advertisements from a local router. For details on how this works on an IPv6 network, see the IETF RFC 2462 "IPv6 Stateless Address Autoconfiguration."

Starting in step 504, the laptop sets the second part of its home address. This part is called the "node-selectable" portion 412 because the device is free to set this part as it sees fit. In IPv6, the node-selectable portion is called the "interface identifier" and is often set to the network interface's Medium Access Control (MAC) address. Here, however, in accordance with the invention, the laptop in step 506 creates a hash 406 of the public key 402 and selects part of the hash to be the node-selectable portion 412 of its home address. In IPv6, the interface identifier comprises 64 bits, but two of those bits (the "u" and "g" bits) should be set to zero, leaving the laptop to choose 62 bits of the hash for the remainder of the interface identifier. While it is not intrinsically important which bits the laptop chooses, its procedure should be well-known so that a recipient of the message can recreate the home address as will be described in greater detail below. For instance, the laptop may choose the lowest-order 62 bits of the hash 406 for use as the interface identifier. In step 508, the laptop checks whether this address is already in use by another node in the network. In other words, the laptop checks whether there is an address conflict with respect to the home address it has generated. Different protocols may provide different ways of determining this. For IPv6, the mechanism is called "duplicate address detection." If the address is not already in use, the process of constructing the home address of the laptop is complete. If the constructed home address is in use by another device, however, the laptop in step 510 chooses a modifier 404, which may be, for example, a 2-bit integer. The laptop appends the modifier 404 to the public key 402, in step 512 creates a hash of the composite number, and again tests to see if the generated address is unique. If necessary, the laptop continues to loop through steps 508, 510, and 512 choosing different modifiers until one is found to produce a home address that is not used by another device.

By constructing the unique home address of the laptop based on its public key, an association between the home address of the laptop and its public/private key pair is created. This association is then used in the authentication mechanism of the invention to allow a recipient of a message to authenticate the sender of the message by verifying the association.

Still describing the embodiment of a mobile device in the form of a laptop and referring now to FIGS. 6 and 7, the laptop sends a binding update message 600 to its home agent and, possibly, to other correspondents when it moves to a new wireless network. The message contains, among other things such as the standard IP header, message content data, the home address 410, and the public key 402 of the laptop. The message content data in this particular example includes the new care-of address 602 of the laptop. In one preferred embodiment, the message also contains data for preventing a replay attack. Such data may include, for instance, a time stamp 604 and data 606 identifying the intended recipient of the message. The identifier of the recipient may be anything that uniquely identifies the recipient and will often be the recipient's network address. The message content data, home address, public key, and the optional data are in plain text (i.e., not hashed or encrypted).

In addition to the plain text data, the message further includes a digital signature generated from the data included in the message. To generate this signature, the laptop in step 702 creates a hash of its care-of address 602, the home address 410 it set earlier, and the optional data such as the timestamp 604 and the identifier of the intended recipient 606. In step 704, a cryptographic signature 608 of the hash generated in step 702 is created from the hash using the private key 400 associated with the public key 402, which was used to create the home address of the laptop. In step 706, the binding update message 600 is populated with the cryptographic signature, the home address, the care-of address, and any optional data that went into forming the signature, the public key, and the modifier 404 if it was used in creating the home address.

Figure 8:
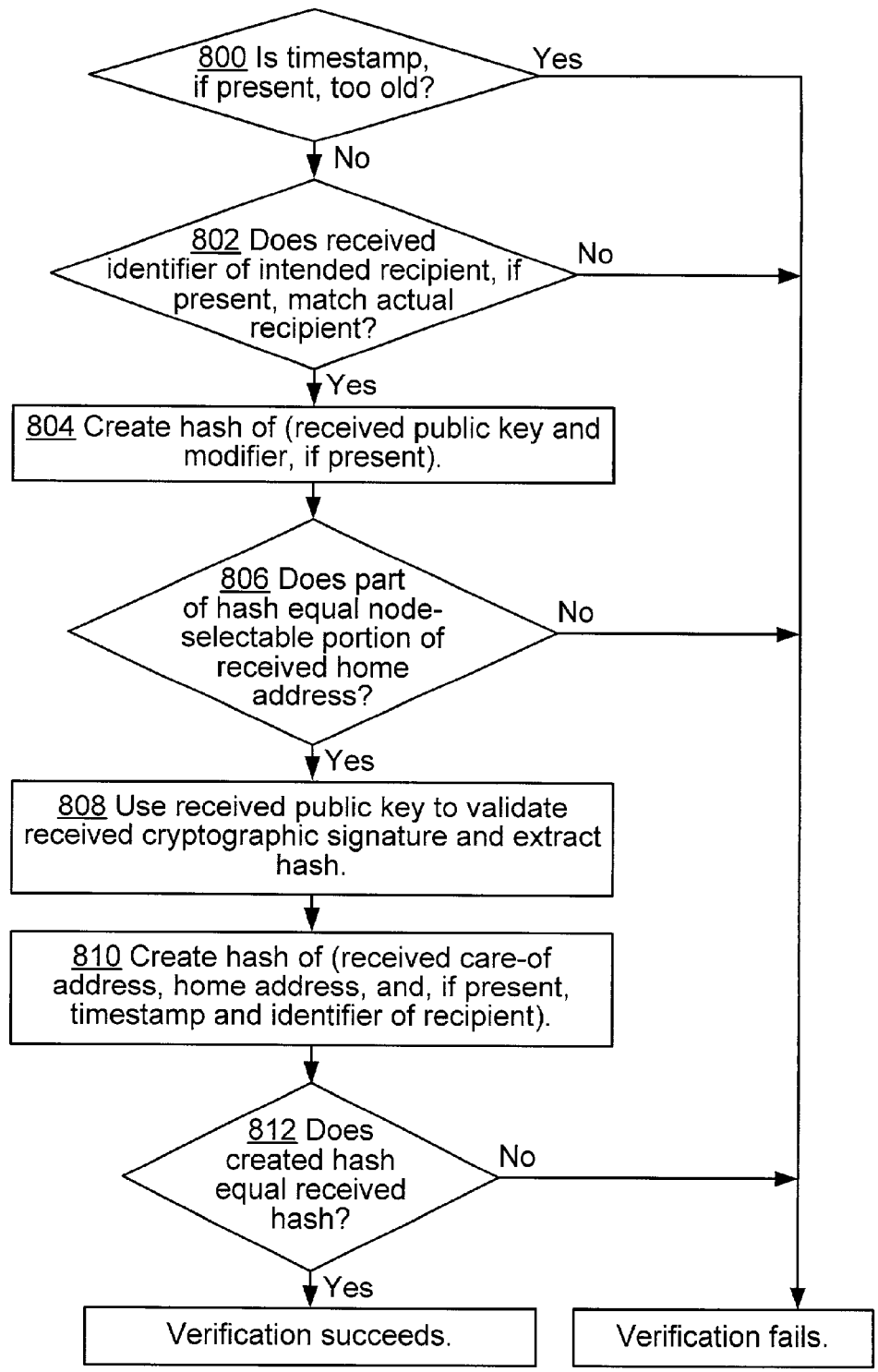
FIG. 8 is a flowchart of a procedure for the home agent to authenticate the update message from the mobile device.

Referring now to FIG. 8, when the home agent 214 receives the binding update message 600, it performs the process in FIG. 8 to decode the message and to attempt to authenticate the identity of the sender of the message. Note that, for the most part, these steps may be performed in any order. In step 800, if there is a timestamp 604 in the message, the home agent compares it to its local time, which should be synchronized with the clock of the mobile device to within a few seconds. The home agent discards the message if it deems the message to be too old. In step 802, if the message contains an identifier of the message's intended recipient 606, the home agent compares the identifier in the message with its own identification and discards the message if there is no match. In steps 804 and 806, the home agent uses the public key included in the binding update message to recreate the node-selectable portion of the sender's home address. This operation is identical to that of step 512 of FIG. 5. Specifically, the home agent hashes the message's public key and modifier, if present, and then takes part of the results of the hash to be the node-selectable portion of the sender's address. Then the home agent compares the value for the node-selectable portion it has generated from the public key with the node-selectable part of the home address 410 in the binding update message. If the two values differ, then there is something amiss and the home agent discards the message. On the other hand, if the two values match, the home agent knows that public key included in the message is the one used to create the home address.

In step 808, the home agent uses the public key 402 in the message to validate the cryptographic signature 608 and extracts the hash that was used to form the signature. In steps 810 and 812, the home agent follows the same procedure of step 702 of FIG. 7 to recreate the hash using the data included in the message. In the illustrated embodiment, these data include the care-of address 602, the home address 410, and, if present, the timestamp 604 and the identifier of the intended recipient 606. If the hash created by the home agent does not match the hash extracted from the cryptographic signature in the message, then the home agent discards the message. If the hash values match, then the home agent knows that the cryptographic signature was written by a device that knows the private key 400 that corresponds to the public key 402 in the message. The home agent also knows, by the results of step 806, that this public key 402 is the one used to create the sender's home address 410. Therefore, the home agent knows that the binding update message must have been written by the device that created the home address 410, the only device with the private key 400, that is to say, by the laptop 100. The laptop's address has been verified, and the home agent is now free to accept the binding update message as authentic. The home agent changes its routing tables so that future messages directed to the laptop's home address are sent to the care-of address contained in the binding update message.

It will be appreciated that the authentication described above in connection with the example in FIGS. 2 through 8 does not depend on any specific attribute of the care-of address. The message can be used for updating any other communication parameter (or parameters) by replacing the care-of address 602 in the message with the data for that parameter and generating the signature accordingly. A generalized parameter update message may contain an identifier specifying which parameter it contains. Note that "update" in the name "parameter update message" need not imply that the parameter has changed, only that the recipient is being updated as to the current value of the parameter. There are many occasions when a sender will inform a recipient of an unchanged parameter value.

It should be appreciated that although the unilateral authentication mechanism of the invention is especially useful for handling parameter update messages from a mobile device, the invention can be used for the authentication of messages with general message contents. This can be done, for example, by simply replacing the care-of address field 602 in the data structure of FIG. 6 with the general message content data and generating the signature from the message content data. Moreover, the sender of the message does not have to be mobile. Instead, the sender may be a stationary node, and in that case the home address may be the "permanent" network address of the sender.

The methods of the present invention are applicable to several other applications, including, for example, detecting and protecting against address impersonation, protecting against "man-in-the-middle" security attacks, optimizing the Internet Key Exchange and other security negotiation algorithms, and preventing illicit repudiation in commercial and other transactions.

The authentication information can be provided to the recipient in any number of ways. For example, the information may be placed in an IPsec Authentication Header or Encapsulating Security Payload, or in a packet option.

The sender may choose to protect multiple messages with the same key pair. In that case, for efficiency's sake, the recipient can cache the public key, and the messages can be sent without the public key. Alternatively, the recipient can discover the public key through a "loose" Public Key Infrastructure mechanism. This mechanism delivers several responses, some of which may be incorrect. The recipient picks the correct response based on the bond between the sender's network address and the public key.

The cryptographic strength of the invention may be improved over the above embodiments by, for example, increasing the number of address bits derived from the public key, and caching public keys on the recipient so that the recipient can detect attempts to use public keys that hash to the same network address.

In view of the many possible embodiments to which the principles of this invention may be applied, it should be recognized that the embodiments described herein with respect to the drawing figures are meant to be illustrative only and should not be taken as limiting the scope of invention. For example, for performance reasons the cryptographic operations may be implemented in hardware, such as on a network card, rather than in software. Therefore, the invention as described herein contemplates all such embodiments as may come within the scope of the following claims and equivalents thereof.

We claim:

1. A method for a mobile computing device to make authentication information available to a base computing device, the method comprising:

creating authentication information, the authentication information including content data that includes data for updating a care-of address of the mobile computing device, a public key of the mobile computing device, a network address of the mobile computing device, and a digital signature, the network address having a route prefix portion and a node-selectable portion that includes a portion of a hash value of a combination of the public key of the mobile computing device and a modifier, the digital signature generated by signing with a private key of the mobile computing device corresponding to the public key, the digital signature generated from data in the set: the content data, a hash value of data including the content data; and making the authentication information available to the base computing device.

2. A method as in claim 1 wherein the authentication information is made available to the base computing device by sending a message incorporating the authentication information to the base computing device.

3. A method as in claim 1, wherein the base computing device is a home agent for the mobile computing device, and wherein the network address of the mobile computing device is a home address of the mobile computing device.

4. A method as in claim 1, wherein the base computing device is a correspondent of the mobile computing device, and wherein the network address of the mobile computing device is a home address of the mobile computing device.

5. A method as in claim 1, wherein the public key and the private key together form an uncertified key pair.

6. A method as in claim 1, wherein the authentication information further includes data for preventing a replay attack.

7. A method as in claim 6, wherein the data for preventing a replay attack are in the set: time stamp, data identifying the second computing device as an intended recipient of the authentication information.

8. A computer-readable storage medium containing instructions for performing a method for a first computing device to make authentication information available to a second computing device, the method comprising:
creating authentication information, the authentication information including content data that include data for updating a care-of address of the first computing device, a public key of the first computing device, a network address of the first computing device, and a digital signature, the network address having a route prefix portion and a node-selectable portion that includes a portion of a hash value of data including the public key of the mobile computing device and a modifier selected for preventing address conflicts, the digital signature generated by signing with a private key of the first computing device corresponding to the public key, the digital signature generated from data in the set: the content data, a hash value of data including the content data; and
making the authentication information available to the second computing device.

9. A computer-readable storage medium having stored thereon a data structure, the data structure comprising:
content data that include data for updating a care-of address of a computing device;
a public key of the computing device;
a network address of the computing device, and a digital signature, the network address having a route prefix portion and a node-selectable portion that includes a portion of a hash value of a composite of the public key of the computing device and a modifier, and
a digital signature, the digital signature generated by signing with a private key of the computing device corresponding to the public key, the digital signature generated from data in the set: the content data, a hash value of data including the content data.

10. A computer-readable storage medium as in claim 9, wherein the network address of the computing device is a home address of the computing device.

11. A computer-readable storage medium as in claim 9, wherein the modifier is used only if deriving the node-selectable portion with the public key results in a network address that is in use by another device.

12. A computer-readable storage medium as in claim 9, wherein the data structure further includes data for preventing a replay attack.

13. A method for a second computing device to authenticate content data made available by a first computing device, the method comprising:
accessing authentication information made available by the first computing device, the authentication information including the content data, a public key of the first computing device, a first network address of the first computing device, and a digital signature;
deriving a node-selectable portion of a second network address by taking a portion of a result of hashing a combination of the public key of the first computing device with a modifier;
validating the digital signature by using the public key of the first computing device; and
accepting the content data if the node-selectable portion of the second network address matches a corresponding portion of the first network address and if the validating shows that the digital signature was generated by the first computing device.

14. A method as in claim 13, further comprising:
determining whether to accept the content data based on a time stamp in the authentication information.

15. A method as in claim 13, wherein the content data include data for updating a communications parameter for the first computing device, the method further comprising:
updating a record of a communications parameter for the first computing device.

16. A method as in claim 15, wherein the communications parameter is a care-of address of the first computing device, and wherein updating includes updating a routing table maintained by the second computing device.

17. A computer-readable storage medium containing instructions for performing a method for a second computing device to authenticate content data made available by a first computing device, the method comprising:
accessing authentication information made available by the first computing device, the authentication information including the content data, a public key of the first computing device, a first network address of the first computing device, a modifier and a digital signature;
deriving a node-selectable portion of a second network address by taking a portion of a result of hashing the public key of the first computing device;
deriving a node-selectable portion of a second network address as a hash value of a composite of the modifier and the public key of the first computing device;
validating the digital signature by using the public key of the first computing device; and
accepting the content data if the node-selectable portion of the second network address matches a node-selectable portion of the first network address and if the validating shows that the digital signature was generated from a device having knowledge of a private key that corresponds to the public key of the first computing device.

* * * * *